Patented Apr. 13, 1943

2,316,673

UNITED STATES PATENT OFFICE 2,316,673

PROCESSING SULPHUR

Dan McDonald, Santa Monica, Calif.

No Drawing. Application September 4, 1940,
Serial No. 355,309

9 Claims. (Cl. 23—299)

This invention is a method of extracting, purifying and/or reducing sulphur to more finely divided form; the sulphur being in sulphur-bearing ore or in residue from flue gas, etc., or being free sulphur which is to be purified and/or reduced to fine crystalline form. This application is a continuation in part of my copending application Ser. No. 249,783, filed January 7, 1939.

The sulphur is contacted with a medium which at approximately the melting point of sulphur has relatively high solvent power for sulphur but which at lower temperature is a non-solvent for sulphur; the solvent power of the medium being greatly enhanced if the temperature is not lower than the melting point of sulphur.

It is an object of the invention to contact sulphur with such a solvent-medium while maintaining superatmospheric pressure whereby the temperature may be raised to approximately and preferably not lower than the melting point of sulphur. If the solvent-medium has a boiling point (at atmospheric pressure) lower than the melting point of sulphur, the superatmospheric pressure insures the desired temperature being attained without boiling the solution, the boiling point being a function of the vapor pressure of the low-boiling solvent-medium and the vapor pressure of any water which may be present; and if the solvent-medium has a boiling point (at atmospheric pressure) higher than the melting point of sulphur, the superatmospheric pressure insures the desired temperature being attained without boiling the solution even though the presence of water has so increased the vapor pressure of the solution that its boiling point (at atmospheric pressure) is below the melting point of sulphur.

By heating to the desired temperature without boiling the resulting sulphur solution, agitation is avoided such as would make it difficult to separate the sulphur solution from tailings, i. e. residual ore or other impurities; and the desired temperature is attained without first boiling away any water which may be present, either added or natural water content including water of crystallization or gypsum or other impurities.

It is a further object of the invention to employ a solvent-medium which does not have an extremely high vapor pressure, since a medium of high vapor pressure, carbon bisulphide for example, would necessitate excessively high superatmospheric pressure being maintained in order to attain the desired temperature.

It is a still further object of the invention to employ a solvent-medium which does not have an extremely low vapor pressure, since a medium of low vapor pressure, e. g. acetylene tetrachloride having a normal boiling point of 146° C. or halogenated derivatives of aromatic hydrocarbons having a normal boiling point in the neighborhood of 200° C. and higher, cannot be readily separated from the sulphur which is subsequently deposited from the sulphur solution.

More particularly it is an object of the invention to employ a solvent-medium having a boiling point (at atmospheric pressure) within a range of approximately 75° C. to 125° C., since such a solvent-medium permits pressure being maintained which will prevent boiling of the solution at temperature approximately the melting point of sulphur, without employing excessively high superatmospheric pressure, and permits recovery of the solvent-medium from the sulphur which is subsequently deposited, by simple distillation without employing high vacuum and without excessive heat consumption or remelting of the deposited sulphur.

It is a still further object of the invention to employ a non-flammable or only moderately flammable solvent-medium, thereby eliminating the danger and precaution necessary in connection with more flammable solvent-media.

It is a still further object of the invention to employ as the solvent-medium one of the chlorinated hydrocarbons having a vapor pressure between that of carbon tetrachloride and perchlorethylene, thus comprising the group of commercially available chlorinated hydrocarbons consisting of carbon tetrachloride, ethylene dichloride, trichlorethylene, propylene dichloride, beta-trichlorethane and perchlorethylene. This group of solvent-media has appreciable solvent power for sulphur at temperature approximately the melting point of sulphur and particularly at temperature not lower than the melting point of sulphur, whereby sulphur may be readily dissolved in such solvent-media at the specified temperature; but at lower temperatures and particularly at ordinary room temperature these chlorinated hydrocarbons are substantially non-solvents for sulphur, whereby sulphur which is in solution at the higher temperature may be readily solidified and deposited by cooling to a lower temperature.

Furthermore, this group of solvent-media have vapor pressures which are not so high as to require excessive superatmospheric pressure for raising their boiling points to approximately and preferably not lower than the melting point of sulphur; and on the other hand have vapor pressures which are not so low as to make it difficult to recover last traces of solvent from the sulphur which is subsequently deposited. This group of solvent-media is also particularly applicable in that, by the standards of Underwriters' Laboratories, they have rating of non-flammability, except ethylene dichloride and propylene dichloride, which have rating of only moderate flammability, as distinguished from highly flammable carbon bisulphide, benzol, toluene, and the like.

It is another object of the invention to produce sulphur in fine crystalline form by spraying a sulphur solution into a zone of reduced pressure for atomized suspension therein, and responsive to the reduced pressure flash-distilling the solvent while the solution is in atomized suspension, for solidifying the sulphur while in finely divided form.

It is a still further object of the invention to thus deposit the sulphur in fine crystalline form, from a sulphur solution, the solvent of which is a non-solvent for sulphur at reduced temperature and having a vapor pressure higher than that which would require excessive reduction in pressure for flash-distillation, but not so high as to require excessive pressure being maintained while heating to the required temperature for producing the sulphur solution from which sulphur is to be subsequently deposited, and the solvent-medium when flash-distilled absorbing heat of fusion of the sulphur so as to solidfy and deposit the same.

It is a still further object of the invention to employ as the solvent-medium, one of the chlorinated hydrocarbons having a vapor pressure between that of carbon tetrachloride and perchlorethylene. The sulphur may thus be contacted with the solvent-medium at temperature substantially not lower than the melting point of sulphur, while maintaining a relatively low superatmospheric pressure, and the solution may then be atomized and may be flash-distilled by employing only a relatively slight reduction in pressure, thereby cooling and depositing the sulphur in fine crystalline form.

It is another object of the invention to deposit sulphur from a sulphur solution in the presence of a conditioner which will retard growth of sulphur particles as they deposit and which will remain with the deposited sulphur for preventing subsequent lumping.

It is a still further object of the invention to dissolve sulphur in a solvent-medium which at reduced temperature is a non-solvent for sulphur, with sulphur subsequently deposited by cooling, the conditioner being added to the sulphur solution and being only slightly soluble therein at temperature at which the solvent-medium is a solvent for sulphur, and being solidified and deposited when the solution is cooled to that temperature which will deposit the sulphur.

It is a still further object of the invention to employ the conditioner with a sulphur solution, the solvent-medium of which is one of the chlorinated hydrocarbons of the group having a vapor pressure between that of carbon tetrachloride and perchlorethylene, and the conditioner begin a medium such as magnesium oxide, magnesium carbonate or magnesium sulphate.

In practice, the sulphur which is to be processed may be free sulphur or in sulphur-bearing material. The sulphur is contacted with a solvent-medium of the group consisting of carbon tetrachloride, ethylene dichloride, trichlorethylene, propylene dichloride, beta-trichlorethane or perchlorethylene, at temperature approximately and preferably not lower than the melting point of sulphur, while maintaining superatmospheric pressure. At such temperature, and particularly at temperature which will melt the sulphur, these solvent-media have high solvent power for sulphur. The superatmospheric pressure is such as to prevent the solution boiling, the boiling point being a function of the vapor pressure of the solvent-medium and of water which may be present, either added or natural water content such as water of crystallization of gypsum or other impurities. The desired temperature is thus attained without agitating the solution, as would result from boiling, and which would make it difficult to separate the sulphur solution from tailings; and is attained without excessive heat consumption, as would be required if it were necessary to first boil away all water which might be present.

The solvent-medium is preferably ethylene dichloride or trichlorethylene, since they are commercially available at a cost which is practical for commercial operations, and their vapor pressures are not so high as to require excessive superatmospheric pressure for raising their boiling points to approximately and preferably not lower than the melting point of sulphur, while on the other hand their vapor pressures are not so low as to make it difficult to distil residual solvent from tailings and from the sulphur which is subsequently deposited.

Perchlorethylene may also be advantageously employed, it being readily available at reasonable cost and having a boiling point (at atmospheric pressure) above the melting point of sulphur, whereby in order to attain temperature of approximately and preferably not lower than the melting point of sulphur the superatmospheric pressure which is maintained need only be such as will compensate for increased vapor pressure resulting from the presence of water. On the other hand, the boiling point of perchlorethylene (at atmospheric pressure) is only slightly above the melting point of sulphur, and therefore it may be readily distilled from tailings and from sulphur which is subsequently deposited, without employing high vacuum and without excessive heat consumption or liability of remelting the deposited sulphur.

The sulphur may be contacted with the solvent-medium in any suitable container, at temperature approximately and preferably not lower than 114.5° C., i. e. the melting point of sulphur, while maintaining superatmospheric pressure which in accordance with the vapor pressure of the particular solvent and the absence or presence of water will prevent boiling at the desired temperature. The sulphur solution, at the temperature and pressure described, is then separated from tailings, i. e. ore or other insoluble impurities initially present with the sulphur, the separation being preferably by decanting. A clean separation is readily obtained since the sulphur solution is not being agitated by boiling. The sulphur solution is then cooled for depositing sulphur.

Another feature of the invention is a method of depositing sulphur from a sulphur solution in fine crystalline form, by spraying the sulphur solution into a zone of reduced pressure for atomized suspension therein, and flash-distilling the solvent of the solution for solidifying the sulphur while still in atomized suspension.

This method of depositing sulphur is applicable to any sulfur solution in which the solvent-medium is a non-solvent for sulphur at reduced temperature, and from which the solvent-medium may be flash-distilled at reduced pressure for absorbing heat of fusion of the sulphur so as to solidify and deposit the same; and is particularly applicable to a sulfur solution which has been formed by a solvent-medium and at temperature and pressure such as previously described, i. e., a chlorinated hydrocarbon of the group having a vapor pressure between that of carbon tetrachloride and perchlorethylene.

As an instance, the solvent for the sulphur solution is preferably ethylene dichloride or trichlorethylene, or perchlorethylene may be advantageously employed. The sulfur solution, at temperature of approximately and preferably not lower than the melting point of sulfur, and at superatmospheric pressure, is sprayed into a zone of reduced pressure for atomized suspension. The reduced pressure is such as to produce a pressure differential for flash-distilling substantially all of the solvent and any water which may be present, thereby absorbing the sulphur's heat of fusion so as to cool and solidify the sulphur while still in atomized suspension. In other words, the reduction in pressure is such as to lower the boiling point of the solution below the melting point of sulphur, the pressure reduction being a reduction to not lower than atmospheric pressure or to subatmospheric pressure depending upon the vapor pressure of the particular solution, but in either case producing sufficient pressure differential for flash-distilling the solvent and solidifying the sulphur.

The sulphur, by solidifying while still in atomized suspension, is formed as fine particles which are then gravitationally deposited without substantial accretion, i. e. the sulphur is deposited in extremely fine crystalline form. The vapors of the flash-distillation are withdrawn from the zone of reduced pressure and from the depositing sulphur; and these solvent vapors, together with aqueous vapor if water is present, are condensed and any water which is present is separated from the solvent condensate, e. g. by gravitational separation, for recovery of the solvent for reuse.

Traces of solvent may be present with the tailings which have been initially separated from the sulphur solution and may be present with the sulphur which is subsequently deposited from the sulphur solution. These last traces of solvent are preferably recovered; and when the solvent is one of the aforementioned chlorinated hydrocarbons having vapor pressure between that of carbon tetrachloride and perchlorethylene, last traces of solvent may be readily recovered by distillation at atmospheric or only slightly subatmospheric pressure, without excessive heat consumption or liability of remelting the deposited sulphur.

Another feature of the invention is a method of supplying a conditioner for retarding lumping of sulphur, preferably by dissolving a conditioner in a sulphur solution and then depositing the conditioner along with the sulphur.

This method of supplying a conditioner is applicable to any sulphur solution from which sulphur is to be subsequently deposited; and is particularly applicable to a sulphur solution which has been formed by a solvent-medium and at temperature and pressure such as previously described, i. e. a chlorinated hydrocarbon of the group having a vapor pressure between that of carbon tetrachloride and perchlorethylene, the conditioner being soluble in the solution at the temperature employed, but solidifying and depositing along with the sulphur when the latter is deposited from the solution.

The conditioner is thus present in intimate contact with the sulphur particles as they solidify and retards growth of these sulphur particles, probably by forming insulation for the individual particles as soon as they are formed and thus retarding accretion of the particles. The conditioner is deposited and remains with the sulphur and retards lumping of the deposited sulphur, probably by forming insulation for the individual particles so as to retard their adhesion.

The conditioner is added to the sulphur solution before the sulphur is deposited therefrom; and the conditioner is only slightly soluble at the temperature, preferably not lower than the melting point of sulphur, at which the sulphur solution is formed. Only that limited quantity of the conditioner which dissolves in the sulphur solution is thus withdrawn with the sulphur solution for deposit therefrom when the sulphur solution is subsequently cooled. The conditioner is thus deposited in limited quantity along with the sulphur, and while it thus forms a theoretical impurity its quantity is so limited that the product is still pure sulphur within a recognized range of commercial purity.

As an instance of conditioners, slightly soluble in sulphur solutions at the temperature and pressure previously described and readily deposited along with the sulphur by cooling, and which in limited quantities do not detract from the commercial purity of sulphur, substances such as magnesium oxide, magnesium carbonate or magnesium sulphate may be employed.

In practice, one of the aforementioned conditioners may be added to ethylene dichloride or trichlorethylene, or to perchlorethylene; and the solvent (with the conditioner) is contacted with sulphur at approximately and preferably not lower than the melting point of sulphur, while maintaining superatmospheric pressure, thereby dissolving limited quantity of the conditioner in the sulphur solution. The sulphur and the conditioner are then deposited from the solution, preferably as previously described, i. e. by atomized suspension of the solution in a zone of reduced pressure whereby the solvent is flash-distilled and the sulphur and the conditioner are solidified while still in atomized suspension. The conditioner is thus present and remains with the gravitationally depositing sulphur, for preventing lumping of the sulphur.

While the method of forming a sulphur solution by heating to temperature approximately the melting point of sulphur while maintaining superatmospheric pressure, and the method of depositing sulphur by atomized suspension and flash-distillation, and the method of depositing a conditioner with the sulphur, have been more or less specifically described, it will be understood that various changes may be resorted to within the scope of the appended claims.

I claim:

1. In processing sulphur with which water is present: contacting the sulphur and the water with a solvent for the sulphur at temperature substantially not lower than the melting point of sulphur, while maintaining superatmospheric pressure at which the solvent-water content does not boil.

2. In processing sulphur with which water is present: contacting the sulphur and the water with a chlorinated hydrocarbon solvent of the group having a boiling point at atmospheric pressure between approximately 75° C. and 125° C., said contact being at temperature substantially not lower than the melting point of sulphur, while maintaining superatmospheric pressure at which the solvent-water content does not boil.

3. In processing sulphur with which water is present: contacting the sulphur and the water with a chlorinated hydrocarbon solvent of the group consisting of ethylene dichloride and trichlorethylene, at temperature not lower than the melting point of sulphur, while maintaining superatmospheric pressure at which the solvent-water content does not boil.

4. In processing sulphur with which water is present: contacting the sulphur and the water with perchlorethylene at temperature not lower than the melting point of sulphur, while maintaining superatmospheric pressure at which the perchlorethylene-water content does not boil.

5. In processing sulphur: contacting sulphur with perchlorethylene at temperature not lower than the melting point of sulphur, while maintaining superatmospheric pressure, spraying the resulting solution into a zone of reduced pressure for atomized suspension, and responsive to pressure differential flash-distilling the solvent of the solution while the solution is in atomized suspension.

6. In processing heated sulphur: dissolving in a sulphur solution a conditioner of the group consisting of magnesium oxide, magnesium carbonate and magnesium sulphate, and absorbing heat from the sulphur and the conditioner which are in solution for simultaneously depositing the sulphur and the conditioner.

7. In processing sulphur: contacting sulphur and a conditioner of the group consisting of magnesium oxide, magnesium carbonate and magnesium sulphate, with a chlorinated hydrocarbon of the group having a boiling point at atmospheric pressure between approximately 75° C. and 125° C., said contact being at temperature not lower than the melting point of sulphur, while maintaining superatmospheric pressure, whereby a solution of sulphur and the conditioner in the chlorinated hydrocarbon is formed and absorbing heat from the sulphur and the conditioner which are in solution, for simultaneously depositing the sulphur and the conditioner.

8. In processing sulphur: contacting sulphur and a conditioner of the group consisting of magnesium oxide, magnesium carbonate and magnesium sulphate, with a chlorinated hydrocarbon of the group consisting of ethylene dichloride and trichlorethylene, said contact being at temperature not lower than the melting point of sulphur, while maintaining superatmospheric pressure, spraying the resulting solution into a zone of reduced pressure for atomized suspension, and responsive to pressure differential flash-distilling the solvent of the solution while the solution is in atomized suspension.

9. In processing sulphur: contacting perchlorethylene with sulphur and with a conditioner of the group consisting of magnesium oxide, magnesium carbonate and magnesium sulphate, said contact being at temperature not lower than the melting point of sulphur, while maintaining superatmospheric pressure, spraying the resulting solution into a zone of reduced pressure for atomized suspension, and responsive to pressure differential flash-distilling the solvent of the solution while the solution is in atomized suspension.

DAN McDONALD.